(12) United States Patent
Le Guillou et al.

(10) Patent No.: US 11,166,213 B2
(45) Date of Patent: Nov. 2, 2021

(54) OPTIMIZING THE CONSUMPTION AND COVERAGE OF A LOCAL AREA NETWORK

(71) Applicant: ORANGE, Issy-les-Moulineaux (FR)

(72) Inventors: Xavier Le Guillou, Chatillon (FR); Dimitri Bricheteau, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/607,255

(22) PCT Filed: Apr. 23, 2018

(86) PCT No.: PCT/FR2018/051009
§ 371 (c)(1),
(2) Date: Oct. 22, 2019

(87) PCT Pub. No.: WO2018/197791
PCT Pub. Date: Nov. 1, 2018

(65) Prior Publication Data
US 2020/0383018 A1 Dec. 3, 2020

(30) Foreign Application Priority Data
Apr. 24, 2017 (FR) ...................................... 1753534

(51) Int. Cl.
*H04W 4/00* (2018.01)
*H04W 36/00* (2009.01)
(Continued)

(52) U.S. Cl.
CPC ........... *H04W 36/08* (2013.01); *H04W 24/02* (2013.01); *H04W 36/0083* (2013.01);
(Continued)

(58) Field of Classification Search
CPC . H04W 36/08; H04W 36/0083; H04W 36/30; H04W 24/02; H04W 48/20; H04W 52/0206
See application file for complete search history.

(56) References Cited

U.S. PATENT DOCUMENTS 8,380,203 B1 * 2/2013 Semersky ............. H04W 84/12
455/437
2004/0246922 A1 12/2004 Ruan et al.
(Continued)

OTHER PUBLICATIONS

English translation of the International Written Opinion dated Jun. 19, 2018 for corresponding International Application No. PCT/FR2018/051009, filed Apr. 23, 2018.
(Continued)

*Primary Examiner* — Erika A Washington
(74) *Attorney, Agent, or Firm* — David D. Brush; Westman, Champlin & Koehler, P.A

(57) ABSTRACT

A method for managing communication of a terminal in a local area network equipped with a plurality of points of access to the network and a device for managing a communication. The terminal is connected to a first access point and able to communicate with at least one second point of access to the network, distinct from the first. The method includes the following acts on the device for managing a communication: receiving a notification of the first access point containing a quality indication; sending a wakeup message to at least one second access point; obtaining at least one quality indication; and, as a function of the quality indication, selecting a second access point to be associated with the terminal.

13 Claims, 3 Drawing Sheets

(51) Int. Cl.
*H04W 36/08* (2009.01)
*H04W 24/02* (2009.01)
*H04W 36/30* (2009.01)
*H04W 48/20* (2009.01)
*H04W 52/02* (2009.01)

(52) U.S. Cl.
CPC .......... *H04W 36/30* (2013.01); *H04W 48/20* (2013.01); *H04W 52/0206* (2013.01)

(56) References Cited

U.S. PATENT DOCUMENTS

| | | |
|---|---|---|
| 2012/0099495 A1 | 4/2012 | Mitra et al. |
| 2014/0078950 A1* | 3/2014 | Jung ................. H04W 52/0235 370/311 |
| 2016/0029407 A1 | 1/2016 | Soldati et al. |
| 2016/0234783 A1 | 8/2016 | Xing |

OTHER PUBLICATIONS

International Search Report dated Jun. 11, 2018 for corresponding International Application No. PCT/FR2018/051009, filed Apr. 23, 2018.
Written Opinion of the International Searching Authority dated Jun. 11, 2018 for corresponding International Application No. PCT/FR2018/051009, filed Apr. 23, 2018.

* cited by examiner

OPTIMIZING THE CONSUMPTION AND COVERAGE OF A LOCAL AREA NETWORK

CROSS-REFERENCE TO RELATED APPLICATIONS

This Application is a Section 371 National Stage Application of International Application No. PCT/FR2018/051009, filed Apr. 23, 2018, which is incorporated by reference in its entirety and published as WO 2018/197791 A1 on Nov. 1, 2018, not in English.

TECHNICAL FIELD

The invention pertains to a network equipped with several access points.

The invention applies in particular to any wireless local area network offering several points of access to the terminals of the network.

PRIOR ART

A local area network is a computer network which links together, by wire or wirelessly, the terminals of a house (computers, printing peripherals, storage peripherals, etc.) which are able to communicate together. A local area network comprises a router item of equipment, also commonly called a domestic gateway, or more simply a gateway, which is an intermediate element ensuring the redirection, or routing, of the data packets between the various terminals and networks which are connected to it. Because the range of such a gateway is not always sufficient to cover all the users of the local area network, the latter furthermore frequently comprises additional access points (for example WiFi extension modules, "WiFi extenders", or Bluetooth communication modules, etc.). Thus, when a terminal can no longer access a given access point, it may possibly be able to hook up to another access point in order to access the resources of the local area network.

So-called "roaming" or "handover" schemes are known from the prior art, allowing a terminal to change access point, in particular when the quality of the communication between the terminal and the current access point to which it is attached drops below a certain threshold deemed acceptable for good communication.

For example, patent US 2004/0246922 proposes such a scheme: the terminal calculates a quality of association with several points of access to the network on the basis of measurements such as signal strength, data losses, etc. In this approach, the terminal maintains a list of possible points of access to the network, comprising for each access point a set of criteria (availability of the access point, quality of the signal, etc.) which allow it to choose at a given instant the best access point.

However, this type of scheme assumes that the diverse access points are active (or at the very least that their wireless communication modules are turned on) permanently, so that the quality of the communication between a terminal and the various points of access to the network can be evaluated in real time. Electrical consumption and electromagnetic radiation, which are two points of attention for today's homes, are not taken into account.

The invention affords a solution not exhibiting the drawbacks of the prior art.

The Invention

To this effect, according to a functional aspect, the subject of the invention is a method for managing communication of a terminal in a local area network equipped with a plurality of points of access to the network and a device for managing a communication, said terminal being connected to a first access point and able to communicate with at least one second point of access to the network, distinct from the first, characterized in that it comprises the following steps on the device for managing a communication:

receiving a notification of the first access point comprising a quality indication relating to the quality of the communication between the terminal and said first access point;

sending a wakeup message to at least one second access point;

obtaining at least one quality indication relating to the quality of the communication between the terminal and said at least one second access point;

as a function of the quality indication, selecting a second access point to be associated with the terminal.

Thus, the invention affords the advantage of selecting at a given instant the best access point for a terminal, in particular if the latter is moving in the local area network, while limiting the electrical consumption of the set of access points of the network. Indeed, an access point which is on standby (or turned off) may be woken up, via the wakeup message, just when it is necessary to perform a new measurement for one of the terminals in the local area network.

By quality indication relating to the quality of the communication between the terminal and said first access point is meant a measurement of quality in relation to any criterion or conceivable combination of criteria for measuring quality of communication between an access point and a terminal in a local area network: power of the signal exchanged, error rate, number of connections to the access point, hardware performance of the access point, etc.

By wakeup message is meant a message able to bring the access point out of a standby mode; a standby mode is a mode in which certain functionalities of the access point are deactivated, thereby making it possible to decrease its energy consumption while allowing faster wakeup.

According to a particular mode of implementation of the invention, a method such as described hereinabove is characterized in that it furthermore comprises a step of sending a closure message to the first access point.

Advantageously according to this mode, the access point that the terminal has quit can be placed on standby or turned off, via the closure message, since it will be woken up subsequently when it becomes necessary to perform a new measurement for one of terminals in the local area network.

By closure message is meant a message to request the cessation of the communication between the access point and the terminal: request placement on standby, turning off of the access point, or simple placement on the blacklist (blacklisting) of the terminal considered.

According to another particular mode of implementation of the invention, which will be able to be implemented alternatively or cumulatively with that above, a method such as described hereinabove is furthermore characterized in that the terminal is able to communicate with at least two second access points and in that the step of selecting a second access point is followed by a step of sending a closure message to the at least one second access point distinct from the second access point selected.

Advantageously according to this mode, the (second) access points which have not been selected can be placed on standby or turned off, via the closure message, since they will be woken up subsequently when it becomes necessary to perform a new measurement for one of terminals in the local area network.

According to another particular mode of implementation of the invention, which will be able to be implemented alternatively or cumulatively with those above, a method such as described hereinabove is furthermore characterized in that the second access point is selected if the indicated quality is above a predetermined threshold.

This mode of implementation of the invention makes it possible to decide rapidly whether a terminal should be detached from the current access point (when the quality indication goes below a certain threshold deemed minimal for acceptable communication) or on the contrary attached to another access point (when the quality indication goes above the threshold).

According to another particular mode of implementation of the invention, which will be able to be implemented alternatively or cumulatively with those above, a method such as described above is characterized furthermore in that the second access point selected is that for which the quality of the communication is the highest.

This mode of implementation of the invention makes it possible to select an access point from among several which are potentially eligible for a communication with the terminal. It is recalled that the measured quality relates to a given criterion or a combination. Thus for example, if two access points are eligible and able to provide identical signal qualities, the selection will be able to be made on the basis of the access point which possesses at this instant the fewest connected terminals.

According to a variant, a method such as described above is characterized furthermore in that the closure message is a request for placement on standby of the access point.

Advantageously according to this variant, the access point is not completely turned off but placed on standby, that is to say in a mode in which it cannot send any presence message, or respond to a request message originating from the network, thereby decreasing its electrical consumption and forcing the terminal to hook up to another access point.

According to another variant, a method such as described above is characterized furthermore in that the closure message is a request for removal of the terminal from the list of terminals that can connect to the access point.

Advantageously according to this variant, the access point is not turned off or placed on standby, and this may be inconvenient if other terminals are connected to it, but the request asks it only to "blacklist" the terminal, that is to say to remove it the terminal from the list of terminals with which it can communicate, thereby constraining the terminal to hook up to another access point.

According to another functional aspect, the subject of the invention is a method for managing an access point of a local area network equipped with a device for managing a communication, said access point being connected to at least one terminal, characterized in that it comprises the following steps at the access point:

a step of evaluating quality, able to provide a quality indication relating to the quality of the communication between the terminal and said access point;

a step of sending, to the device for managing a communication, a message of notification of quality comprising the quality indication evaluated;

a step of obtaining a message of modification of the state of the access point, originating from the device for managing a communication;

a step of modifying the state of the access point as a function of the modification message received.

This embodiment of the invention makes it possible to benefit from an "intelligent" access point, insofar as it is capable of calculating and uploading to the control module the quality of the communication that it establishes with a terminal, and of placing itself on standby (or turning itself off) and then waking up on request of the control module, thus economizing on the energy that it consumes.

The subjects according to this aspect of the invention achieve at least the same advantages as those achieved by the method according to the first aspect. The optional characteristics mentioned for the first aspect may apply here.

According to a hardware aspect, the invention also relates to a device for managing communication of a terminal in a local area network equipped with a plurality of points of access to the network, said terminal being able to communicate with a first point of access to the network when it is situated in a zone of coverage of said access point and with at least one second access point, distinct from the first, characterized in that it comprises the following modules:

a module for receiving a notification of the first access point comprising a quality indication relating to the quality of the communication between the terminal and said first access point;

a module for sending a wakeup message to at least one second access point;

a module for obtaining at least one quality indication relating to the quality of the communication between the terminal and said at least one second access point;

a module for selecting a second access point to be associated with the terminal, as a function of the measurement of quality;

The term module may correspond either to a software component or to a hardware component or a set of hardware and software components, a software component itself corresponding to one or more computer programs or subprograms or more generally to any element of a program able to implement a function or a set of functions such as are described for the modules concerned. In the same way, a hardware component corresponds to any element of a hardware set able to implement a function or a set of functions for the module concerned (integrated circuit, chip card, memory card, etc.).

According to another hardware aspect, the invention also relates to a domestic gateway comprising a communication management device such as described hereinabove.

According to another hardware aspect, the invention also relates to an access point of a local area network equipped with a device for managing a communication, said access point being able to communicate with a terminal when it is situated in a zone of coverage of said access point, characterized in that it comprises the following modules:

a module for evaluating quality, able to provide a quality indication relating to the quality of the communication between the terminal and said access point;

a module for sending, to the device for managing a communication, a message of notification of quality comprising the quality indication evaluated;

a module for obtaining a message of modification of the state of the access point, originating from the device for managing a communication;

a module for modifying the state of the access point as a function of the modification message received.

According to another hardware aspect, the invention also relates to a telecommunication system in a local communications network, including:

at least one terminal, a plurality of access points, each of which being able to communicate with the terminal when it is situated in a zone of coverage of said access point, comprising:

a module for evaluating quality, able to provide a quality indication relating to the quality of the communication between the terminal and the access point;

a module for sending, to the device for managing a communication, a message of notification of quality comprising the quality indication evaluated;

a module for obtaining a message of modification of the state of the access point, originating from the device for managing a communication;

a module for modifying the state of the access point as a function of the modification message received, a gateway of the communication network authorizing communications between said access points and said at least one terminal;

a device for managing a communication comprising:

a module for receiving a notification of the first access point comprising a quality indication relating to the quality of the communication between the terminal and said first access point;

a module for sending a message to at least the second access point, so as to activate said at least one second access point;

a module for obtaining at least one quality indication relating to the quality of the communication between the terminal and said at least one second access point;

a module for selecting a second access point to be associated with the terminal, as a function of the measurement of quality.

According to another hardware aspect, the invention also relates to a computer program able to be implemented on a communication management device such as defined hereinabove, the program comprising code instructions which, when the program is executed by a processor, carries out the steps of the method for managing communication described hereinabove.

According to another hardware aspect, the invention also relates to a computer program able to be implemented on a device for managing an access point such as defined hereinabove, the program comprising code instructions which, when the program is executed by a processor, carries out the steps of the method for managing an access point described hereinabove.

The subjects according to the hardware aspects of the invention achieve at least the same advantages as those achieved by the method according to the first aspect.

A program can use any programming language, and be in the form of source code, object code, or of code intermediate between source code and object code, such as in a partially compiled form, or in any other desirable form.

According to yet another hardware aspect, the invention deals with a recording medium readable by a data processor on which is recorded a program comprising program code instructions for the execution of the steps of a method as is defined hereinabove.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk. Moreover, the information medium can be a transmissible medium such as an electrical or optical signal, which can be conveyed via an electrical or optical cable, by radio or by other means. The program according to the invention can be in particular downloaded over a network of Internet type. Alternatively, the information medium can be an integrated circuit in which the program is incorporated, the circuit being adapted to execute or to be used in the execution of the method in question.

The invention will be better understood on reading the description which follows, given by way of example and with reference to the appended drawings.

THE FIGURES

DETAILED DESCRIPTION OF AN EXEMPLARY EMBODIMENT ILLUSTRATING THE INVENTION

Figure 1:
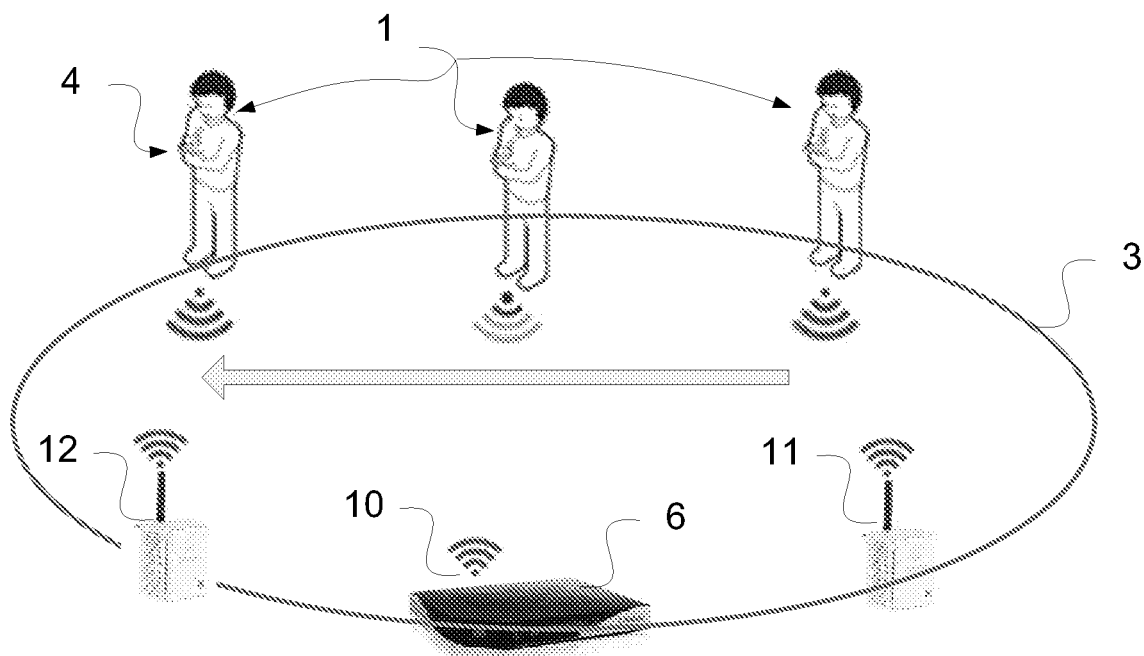
FIG. 1 represents a "handover" situation in a local area network according to the prior art.

FIG. 1 represents a "handover" situation in a local area network according to the prior art.

The local area network (3) is for example a wired and/or wireless IP (Internet Protocol) local area network. The local area network (3) comprises a domestic gateway (6) equipped with a WiFi access point (10), and secondary access points, for example WiFi extension modules (WiFi extenders) 11 and 12. These WiFi extension routers could be, according to a variant, replaced with communication modules of Bluetooth type.

The user (1), carrying a handheld device (4), or terminal, is moving in the context of the local area network. Hereinafter, by terminal is meant any device able to connect on the local area network, such as a laptop computer, a smartphone, a tablet, a digital television decoder, etc.

According to the example illustrated, the user travels in the direction of the arrow and successively occupies three distinct positions: an initial position (on the right), a final position (on the left) and an intermediate position (in the middle). In the course of his movements, he gradually exits the range of the access point 11 to which he is connected and enters the range of the access point 12. When the strength of the signal becomes too weak to continue to communicate with the access point 11, he switches over to the access point 12. According to this example, the various access points (that of the gateway, 10, and the elements 11 and 12) should be turned on permanently so that the user can switch over from one to the other. This situation consumes energy.

Figure 2:
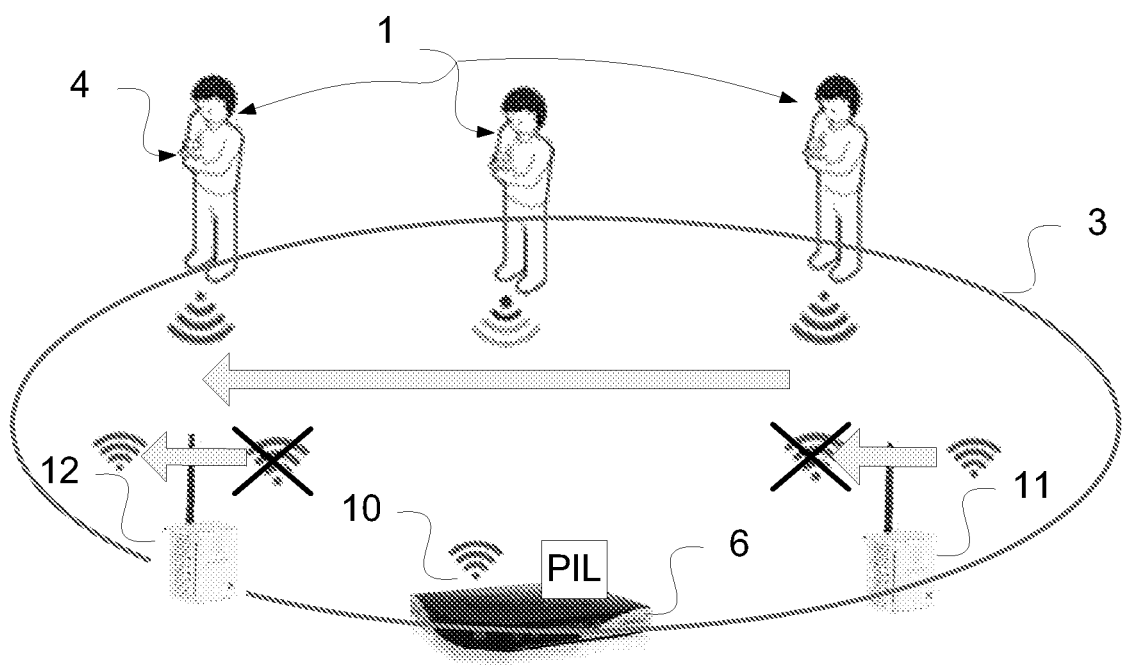
FIG. 2 represents a "handover" situation in a local area network according to one embodiment of the invention.
Figure 4:
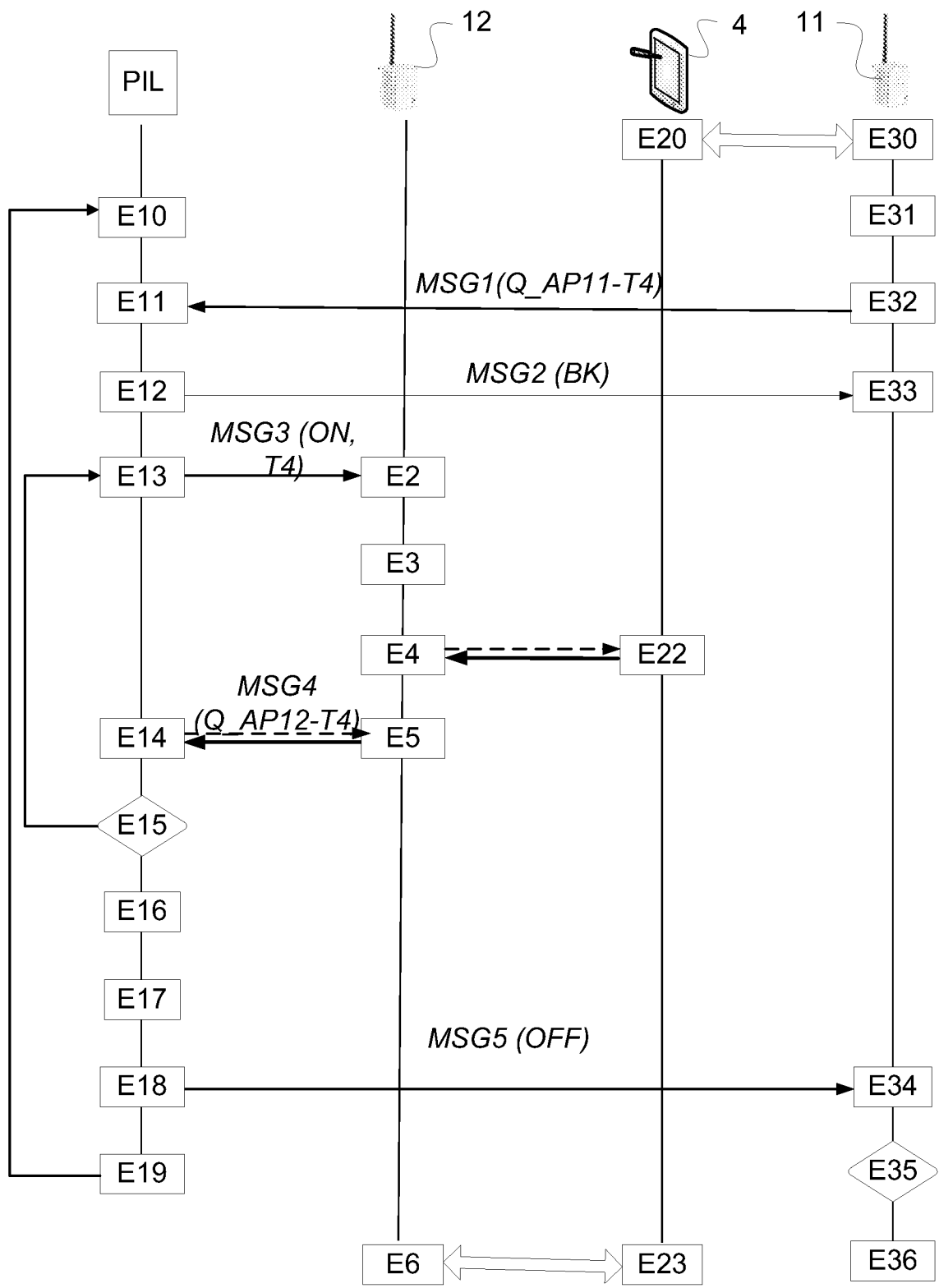
FIG. 4 represents a flowchart illustrating the various steps of a method according to one embodiment of the invention.

FIG. 2 represents a "handover" situation in a local area network according to one embodiment of the invention, which will be illustrated in greater detail in support of FIG. 4. As described previously in support of FIG. 1, the user (1), carrying a terminal (4), is moving in the context of the local area network, in the direction of the arrow. In contradistinction to the situation illustrated in FIG. 1, however, only the access points to which terminals are actually connected are active. The others (for which no connection is recorded) are inactive, they are for example in a standby state, that is to say that their consumption is reduced but they can be woken up by a wakeup message.

Generally, a terminal of a domestic network consumes energy. It is therefore usual to turn it off or to place it on standby when it is not necessary to use it. A standby mode is a mode in which certain functionalities of the terminal are deactivated, thereby making it possible to decrease its energy consumption while allowing faster wakeup. Several standby levels sometimes exist for one and the same item of equipment. For example, a so-called "active" standby is characterized by limited operation of the access point: the WiFi access point, which normally uses an AP (access point) mode and an STA (station) mode simultaneously, will stop its AP function but keep its STA function which maintains the communication with the access point to which it is connected, so as to maintain the message transmission channel. Hereinafter, by standby is meant a state of the item of equipment in which it cannot send any presence message, or respond to a request message originating from the network.

There exist several mechanisms for waking up the terminals of a local area network: if the items of equipment are connected by Ethernet, it is possible to contemplate using a wakeup protocol of "Wake on Lan (WoL)" type, a standard of Ethernet networks which allows a terminal which is turned off to be booted remotely. A similar protocol, "Wake on WLAN (WoWL)" can be used for a terminal connected by Wi-FI. If the items of equipment have a Zigbee module, a low-power radio wireless technology, it is possible to exchange, on a radio channel, messages in accordance with the ZigBee protocol. In the latter case it is possible to address terminals which are in standby states, or indeed turned off, since the module which ensures the Zigbee protocol may have its own power supply, and therefore wake up the turned-off terminal on receipt of the wakeup message.

It is therefore beneficial to be able to turn off the network access points or place them on standby when no terminal is connected to them, and to turn them back on if the connection of a terminal becomes relevant. To this effect, the system comprises a control module able to control and monitor the state of the access points in the network, and access points fitted moreover with an intelligent module which allows them to transmit information, such as for example the power level measured between an access point and a terminal, as well as to go on standby or to wake up on request of the control module.

According to the example illustrated in FIG. 2, by virtue of the control module and of the intelligent module of the access points, the following steps are strung together as the user moves toward the left:

1. The user's terminal is attached to the access point 11 to communicate on the local area network. The access point 12 is on standby. The access point 10 of the gateway 6 is turned on since other terminals are connected to it.

2. The user begins to move, getting further away from the access point 11, therefore the quality of the communication deteriorates.

3. The control module detects this deterioration in quality (for example on receipt of an alert message of the access point) and reactivates (wakes up) all the access points which are on standby, so as to perform measurements; in this instance in this example, the access point 12 is on standby, the control module therefore wakes it up (by transmitting a WoWL message to it for example) and obtains on its behalf measurements of quality of the connection between the access point 12 and the terminal (4). The access point 10 of the gateway has remained turned on, it is therefore not necessary to wake it up, but only to recover measurements of quality of the connection between the access point of the gateway (10) and the terminal (4).

4. The control module chooses the best access point, according to our example 12, and asks the others (10 and 11) to place themselves on standby. On obtaining this message, the access point 11 places itself on standby since no other terminal is connected to it, and the access point 10 of the gateway remains turned on since a certain number of terminals of the local area network are connected to it.

Thus, at a given instant, an access point which is not useful can be placed on standby by virtue of the control module, thereby allowing savings to be made and making it possible to remove the wave effects not desired by the user.

A control module such as described here is therefore capable of turning an access point on or off, of measuring the levels of quality of communication between all the access points and terminals so as to choose which access points should be turned on or turned off, and of waking up all the access points so as to perform new measurements upon notification of one of them.

Figure 3:
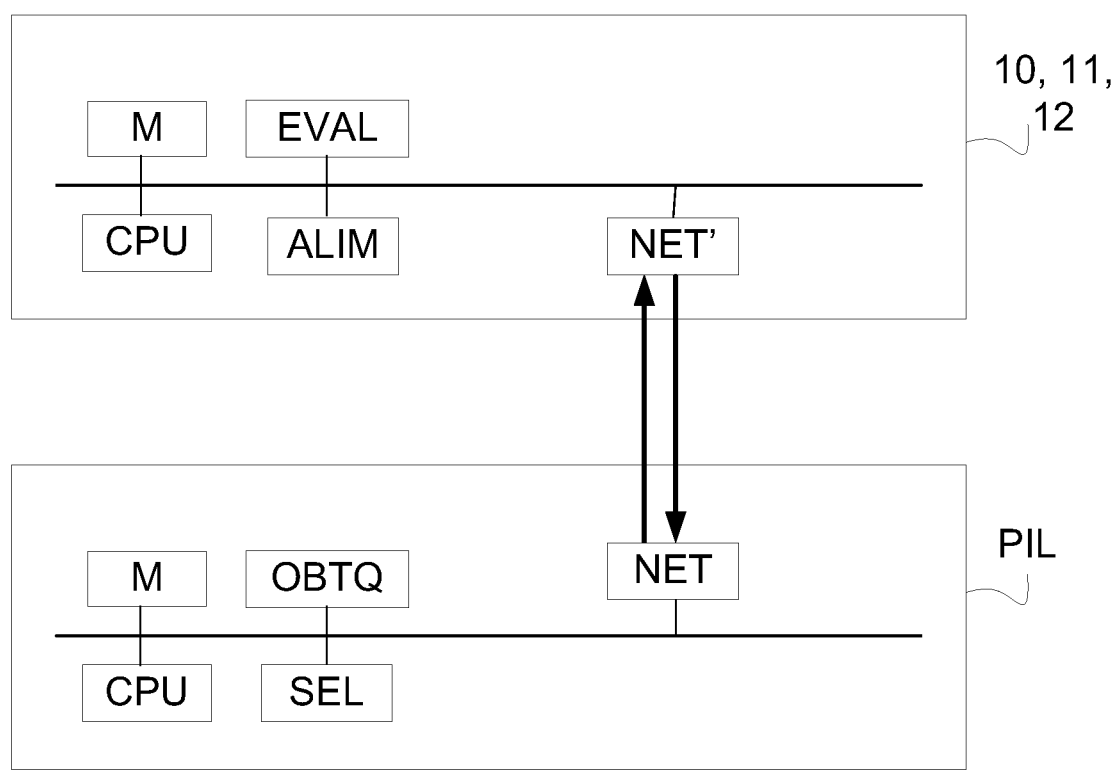
FIG. 3 represents an architecture of the system according to one embodiment of the invention.

FIG. 3 represents an architecture of the system according to one embodiment of the invention.

According to this embodiment, the control module (PIL) is independent, or included in one of the connected items of equipment of the local area network (PC, hard disk, TV, etc.). It is linked to the various access points (10, 11, 12) so as to fulfill the functionalities which were stated hereinabove:

turning on, waking up, placing on standby or turning off an access point;

requesting the barring of a terminal from the list of terminals of the access point (blacklisting);

obtaining at least one value of quality of the communication between an access point and a terminal, according to a given criterion;

choosing, as a function of the value measured on various access points, the access point to which a terminal should be connected.

The control module PIL comprises, conventionally, memories (M) associated with a processor (CPU). The memories can be of ROM (Read Only Memory) or RAM (Random Access Memory) or else Flash type. It communicates with the local area network and the Internet network via the module NET (Ethernet, ADSL, WiFI, Bluetooth, Zigbee, etc.). An Ethernet module makes it possible in particular to send and receive wakeup commands of WoL type. A WIFI/Bluetooth module makes it possible to communicate wirelessly on a radio channel. A Zigbee module makes it possible to exchange, on a radio channel, messages in accordance with the ZigBee protocol (for example wakeup messages). The module NET is able furthermore to transmit the appropriate orders for a modification of the state of the access point (place on standby, turn off, exit standby, turn back on, "blacklist" a terminal, etc.) and receive notifications on the part of the access point relating to the quality of the communication with the various terminals.

The device furthermore comprises, in accordance with this embodiment of the invention, a module OBTQ for obtaining at least one value of quality of the communication between an access point and a terminal, according to a given criterion and a module SEL for selecting an access point.

The access point (PA, 10, 11, 12) according to the invention comprises for its part, conventionally, memories (M) associated with a processor (CPU). The memories can be of ROM (Read Only Memory) or RAM (Random Access Memory) or else Flash type. The access point (10, 11, 12) communicates with the local area network and the Internet network via a module NET' (Ethernet, ADSL, WiFI, Bluetooth, Zigbee, etc.). It exchanges in particular thereby notifications to the access point relating to the quality of the communication with the various terminals. The access point furthermore comprises:

a management module ALIM for analyzing the orders received on the part of the access point relating to the state, in particular electrical, of the access point and for taking the appropriate actions (place on standby, turn off, turn back on, etc.)

a module EVAL for evaluating the quality of a communication with a given terminal, as a function of a certain quality criterion.

According to another embodiment of the invention, the control module is integrated into the domestic gateway. This may entail, for example, a simple software module of the gateway making use of the software modules and hardware modules present in the gateway, or according to another example an independent hardware entity hosted by the gateway.

FIG. 4 represents a flowchart illustrating the various steps of a method according to one embodiment of the invention.

The system described in FIG. 4 picks up the context of FIG. 2: it comprises a first terminal (4) which uses the local area network, a second terminal (2, not represented), two access points (11) and (12) and a control module (PIL) which may be installed on the local area network in an autonomous manner, or form part of one of the objects of the local area network (gateway, PC, STB, etc.).

According to this example, the terminal (4) is firstly connected to the access point 11.

During an initial step E10, the control module PIL takes cognizance or learns the topology of the house, that is to say that it takes cognizance of the various access points available for the local area network, and then it initializes a table termed the "table of associations" which comprises for each access point:

its electrical state (on/off/on standby, etc.)

a criterion for grading the quality of the communication between the access point and the terminals of the network. It is assumed according to this example that two terminals (4, 2) only are liable to change position in the network, and therefore to quit an access point so as to rally to (hook up to) another.

Any initial value of quality can be used in this table. Indeed, one may choose for this value to be irrelevant during the initialization step. As a variant, one may dispose in the table the last value stored during a previous calculation, or else a differential value corresponding to several previous measurements, etc.

Naturally this table is just one possible example of implementation, given by way of illustration. Any other means within the scope of the person skilled in the art making it possible to record the information relating to the quality of the communications may be used.

FIG. 1: Table of associations of the control module (PIL)-initial state

| #AP | AP ON/OFF | Signal/ Terminal (4) | Signal/ Terminal (2) |
| --- | --- | --- | --- |
| 10 | ON | 5 | 2 |
| 11 | ON | 10 | 3 |
| 12 | OFF | 2 | 4 |

During a step E11, the control module receives a message (MSG1) from the access point 11 pertaining to the terminal 4. This message comprises at least one item of information which relates to the quality of the communication between the access point and the terminal and which was calculated by the access point during step E31. It is denoted Q_AP11-T4 to signify a measurement of quality between the access point 11 and the terminal 4. The identifiers used to tag the access point and the terminal may be for example their IP, MAC addresses, etc. The criterion used to measure the quality of the communication between the access point and the terminal may be for example a measurement of the useful bitrate between the two devices, of the power of the signal, of the rate of resending of the packets, etc. It will be noted that the access point may choose to transmit this message solely when the measured quality of the signal goes below a certain predefined (acceptable) threshold of quality. In this case, this message may be empty of any explicit value of quality, but indicate simply that the quality is no longer acceptable.

The quality tied to the criterion deteriorates on account of the motion of the user, until it crosses a predetermined threshold. This threshold depends on the criterion, on the topology of the network, on the number of access points, etc. For example, if the criterion measures the power of the signal, this threshold may be fixed at −65 dBm (decibels-milliwatt) so as to be able to process a video stream, −70 dBm to exchange messages of email type, etc.

During a step E12, the control module transmits a message MSG2 to the access point to signify to it the end of the communication with the terminal 4. According to the terminology in use, the access point is here "blacklisted", or placed on the blacklist of access points which can no longer accept communication with the terminal. Alternatively the control module can transmit a place-on-standby and/or turn-off request to the access point. As a consequence of taking this message into account, the terminal 4 will be able to reconnect automatically, as will be seen later, to the access point which will be chosen for it by the method according to the invention: it can indeed reconnect to a second access point only if it has quit the first.

Next, during a step E13, the access point reactivates another access point by dispatching a wakeup message. This message is denoted MSG3 (ON, T4) to indicate a request for activation of the access point with the aim of measuring the quality of the communication with the terminal 4. According to the example, the access point 12, on receipt of this message, turns back on if it is off, during a step E3, and then measures during a step E4 the quality of the communication, according to the applicable criterion (bitrate, losses, etc.) with the terminal 4 from which it has received an identification value (T4) as parameter of the message MSG3. To measure the quality of the communication, any technique within the scope of the person skilled in the art may be envisaged: measurement of bitrate on using a performance measuring tool, measurement of the attenuation with the data of the Wi-FI antenna, indicators accessible in the WiFi card measurements (attenuation, etc.)

It will be noted that, alternatively, the identification of the terminal might not be transmitted in the message, the access point then being in charge of measuring the quality of the communication with all the terminals which may be connected to it.

During a step E14, the control module PIL receives an indication of quality measured, originating from the access point, in the form of a message denoted MSG4 (Q_AP12-T4).

During a step E15, it analyses the indication of quality received. If the criterion is fulfilled, that is to say if for example the communication with the access point is above a certain predetermined threshold, it is possible, according to a first variant, merely to retain (select) this access point and therefore to continue to step E16. If on the contrary the criterion is not fulfilled, we return to step E13 to choose another access point.

It will be noted that, according to a variant, it is possible to return to step E13 independently of the result of the test, so as to collect the information relating to several access points and retain the best thereof.

According to yet another variant, it is possible to broadcast the message MSG3 to all the access points simultaneously, by using for example a multicast command, or by directing the message to all the known access points, etc.

The table of associations TA can then be reupdated in the course of a step E16. According to an example, this culminates in the updated table as presented hereinbelow, in which:

all the gadgets are turned on (ON);
the measurements of communication quality have been updated for the three access points and the two terminals;
the terminal 4 is blacklisted at the access point 11 (BK).

| FIG. 2: Updated table of associations of the control module (PIL) | | | |
|---|---|---|---|
| #AP | AP ON/OFF | Signal/Terminal (4) | Signal/Terminal (2) |
| 10 | ON | 5 | 10 |
| 11 | ON | BK | 2 |
| 12 | ON | 10 | 2 |

Next, during a step E17, the control module chooses the "best" AP, that is to say the one which best fulfills the quality criterion required.

During a succeeding step E18, the most favorable access point having been chosen, that is to say 12 according to the example, the other access points, which have not been selected, can be placed on standby, or turned off, independently of the fact that they have or have not been blacklisted in step E12. A message MSG5 is transmitted to them to this effect.

During a final step E19, the table of associations can again be revised through an update in particular of the state (on/off/on standby) of the access points. A return can then be performed to step E10, awaiting a new message originating from an access point.

On completion of the method according to this example, the terminal 4 is in communication with the access point 12 and the access point 11 is on standby (or turned off).

It goes without saying that the embodiment which has been described hereinabove has been given purely by way of wholly nonlimiting indication, and that numerous modifications may easily be made by the person skilled in the art without however departing from the scope of the invention.

The invention claimed is:

1. A method comprising:
managing communication of a terminal in a local area network equipped with a plurality of points of access to the network and a device for managing a communication, said terminal being connected to a first access point and able to communicate with at least one second point of access to the network, distinct from the first, wherein the managing comprises the following acts on the device for managing a communication:
receiving a notification of the first access point comprising a quality indication relating to a quality of the communication between the terminal and said first access point;
sending a wakeup message to at least one second access point;
obtaining at least one quality indication relating to a quality of the communication between the terminal and said at least one second access point;
as a function of the quality indication relating to the quality of the communication between the terminal and said at least one second access point, selecting a second access point of the at least one second access point to be associated with the terminal, and sending a closure message to the first access point, wherein the closure message is a request for placement on standby of the first access point.

2. The method for managing communication as claimed in claim 1, wherein the terminal is able to communicate with at least two second access points and wherein the act of selecting a second access point is followed by an act of sending a closure message to the at least one second access point distinct from the second access point selected.

3. The method for managing communication as claimed in claim 2, wherein the closure message sent to the at least one second, distinct access point is a request for placement on standby of the at least one second access point distinct from the second access point selected.

4. The method for managing communication as claimed in claim 2, further comprising sending a closure message to the at least one second, distinct access point containing a request for removal of the terminal from the list of terminals that can connect to the at least one second access point distinct from the second access point selected.

5. The method for managing communication as claimed in claim 1, wherein the second access point is selected if the indicated quality of the communication between the terminal and said at least one second access point is above a predetermined threshold.

6. The method for managing communication as claimed in claim 1, wherein the second access point selected is that for which the quality of the communication between the terminal and that second access point is the highest.

7. The method for managing communication as claimed in claim 1, further comprising sending a closure message containing a request for removal of the terminal from the list of terminals that can connect to the first access point.

8. A method comprising:
managing a current access point of a local area network equipped with a device for managing a communication, said current access point being connected to at least one terminal, wherein the managing comprises the following acts performed by the current access point:
evaluating quality, to provide a quality indication relating to quality of communication between the terminal and said current access point;
sending, to the device for managing a communication, a message of notification of quality comprising the quality indication evaluated;
receiving a closure message originating from the device for managing a communication to modify a state of the current access point by placing the current access point on standby; and
placing the current access point on standby as a function of the closure message received.

9. A device for managing a communication of a terminal in a local area network equipped with a plurality of points of access to the network, said terminal being able to communicate with a first point of access to the network when the terminal is situated in a zone of coverage of said access point and with at least one second access point, distinct from the first, wherein the device comprises:
a processor; and a non-transitory computer-readable medium comprising instructions stored thereon, which when executed by the processor configure the device to perform acts comprising:

receiving a notification of the first access point comprising a quality indication relating to quality of the communication between the terminal and said first access point;

sending a wakeup message to at least one second access point;

obtaining at least one quality indication relating to quality of the communication between the terminal and said at least one second access point;

selecting a second access point of the at least one second access point to be associated with the terminal and sending a closure message to the first access point, as a function of the quality indication relating to the quality of the communication between the terminal and said at least one second access point, wherein the closure message is a request for placement on standby of the first access point.

10. The device according to claim 9, wherein the device is implemented in a domestic gateway.

11. An access point of a local area network equipped with a device for managing a communication, said access point being able to communicate with a terminal when the terminal is situated in a zone of coverage of said access point, wherein the access point comprises:

a processor; and a non-transitory computer-readable medium comprising instructions stored thereon, which when executed by the processor configure the access point to perform acts comprising:

evaluating quality to provide a quality indication relating to quality of the communication between the terminal and said access point;

sending, to the device for managing a communication, a message of notification of quality comprising the quality indication evaluated;

receiving a closure message originating from the device for managing a communication to modify a state of the access point by placing the current access point on standby; and placing the access point on standby as a function of the closure message received.

12. A telecommunication system in a local communications network, including:

at least one terminal, a plurality of access points, each of which being able to communicate with the terminal when the terminal is situated in a zone of coverage of said access point, comprising:

a first processor; and a first non-transitory computer-readable medium comprising instructions stored thereon, which when executed by the first processor configure the access point to perform acts comprising:

evaluating quality to provide a quality indication relating to quality of the communication between the terminal and the access point;

sending, to a device for managing a communication, a message of notification of quality comprising the quality indication evaluated;

receiving a closure message originating from the device for managing a communication to modify a state of the access point by placing the current access point on standby;

placing the access point on standby as a function of the closure message received, a gateway of the communication network authorizing communications between said access points and said at least one terminal; and the device for managing a communication, the device comprising:

a second processor; and a second non-transitory computer-readable medium comprising instructions stored thereon, which when executed by the second processor configure the device to perform acts comprising:

receiving the message of notification from a first access point of the plurality of access points, comprising the quality indication relating to the quality of the communication between the terminal and said first access point;

sending a message to at least one second access point, so as to activate said at least one second access point;

obtaining at least one quality indication relating to the quality of the communication between the terminal and said at least one second access point;

selecting a second access point of the at least one second access point to be associated with the terminal and sending a closure message to the first access point, as a function of the quality of the communication between the terminal and the selected second access point, wherein the closure message is a request for placement on standby of the first access point.

13. A non-transitory computer-readable medium comprising a computer program stored thereon, comprising code instructions which when executed by a processor of a communication management device configure the communication management device to perform a method comprising:

managing communication of a terminal in a local area network equipped with a plurality of points of access to the network and the communication management device, said terminal being connected to a first access point and able to communicate with at least one second point of access to the network, distinct from the first, wherein the managing comprises:

receiving a notification of the first access point comprising a quality indication relating to a quality of the communication between the terminal and said first access point;

sending a wakeup message to at least one second access point;

obtaining at least one quality indication relating to a quality of the communication between the terminal and said at least one second access point; and as a function of the quality indication relating to the quality of the communication between the terminal and said at least one second access point, selecting a second access point of the at least one second access point to be associated with the terminal, and sending a closure message to the first access point, wherein the closure message is a request for placement on standby of the first access point.

* * * * *